United States Patent [19]

McEntee

[11] 4,313,422
[45] Feb. 2, 1982

[54] COLLAPSIBLE STRUCTURAL ASSEMBLY ESPECIALLY SUITABLE AS A SOLAR CONCENTRATOR

[75] Inventor: John F. McEntee, Boulder Creek, Calif.

[73] Assignee: Acurex Solar Corporation, Mountain View, Calif.

[21] Appl. No.: 190,497

[22] Filed: Sep. 25, 1980

[51] Int. Cl.³ ............................ F24J 3/02; G02B 5/10
[52] U.S. Cl. .................................... 126/426; 126/438; 350/293
[58] Field of Search ............... 126/438, 439, 417, 426, 126/450; 165/67, 68, 46; 350/288, 293, 298, 306

[56] References Cited

U.S. PATENT DOCUMENTS

| | | | |
|---|---|---|---|
| 4,134,387 | 1/1979 | Tornstrom | 350/293 |
| 4,135,493 | 1/1979 | Kennedy | 126/438 |
| 4,161,942 | 7/1979 | Monk | 126/438 |
| 4,171,876 | 10/1979 | Wood | 126/438 |
| 4,173,397 | 11/1979 | Simpson | 126/438 |
| 4,174,704 | 11/1979 | Nelson | 126/438 |
| 4,184,482 | 1/1980 | Cohen | 126/426 |
| 4,240,406 | 12/1980 | Hutchison | 126/438 |
| 4,262,660 | 4/1981 | Ilich | 126/426 |
| 4,263,893 | 4/1981 | Pavlak et al. | 126/426 |
| 4,268,332 | 5/1981 | Winders | 126/438 |

*Primary Examiner*—Daniel J. O'Connor
*Attorney, Agent, or Firm*—Flehr, Hohbach, Test

[57] ABSTRACT

A collapsible structural assembly including first and second flexible sheets disposed in confronting relationship to one another is disclosed herein. The assembly also includes an arrangement of ribs located between and connected with the sheets so as to support the sheets as a single unit for movement between a first collapsed position such that the sheets lie flat and adjacent one another with the ribs therebetween and a second extended position such that sheets have predetermined curved configurations and the ribs serve as structural reinforcements therebetween. In the actual embodiment disclosed, one of the sheets includes an outermost light reflective surface and the predetermined curvature conferred upon the sheets including the light reflective surface is that of a parabola. In this way, the entire assembly may serve as a trough-line parabolic concentrator comprising part of an overall solar collector.

1 Claim, 8 Drawing Figures

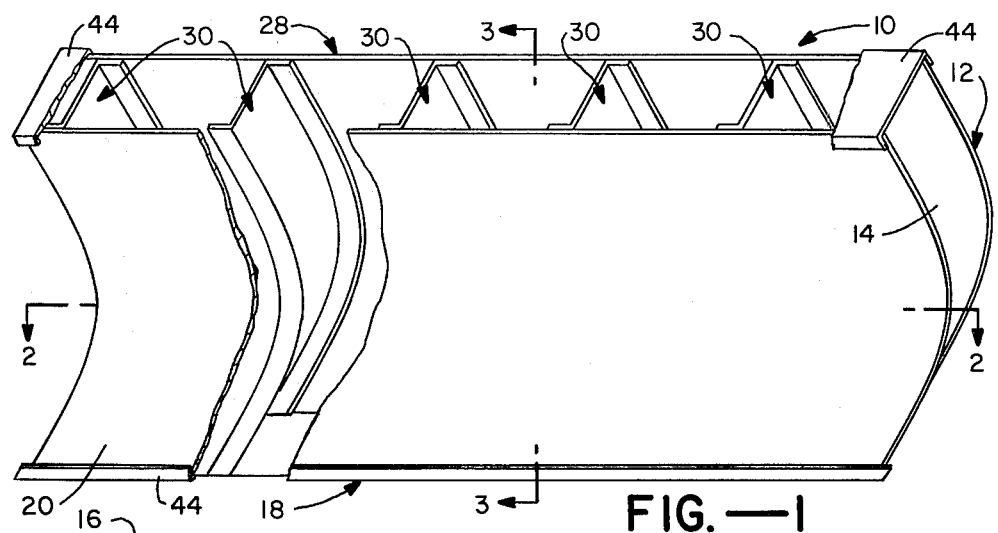
FIG.—1
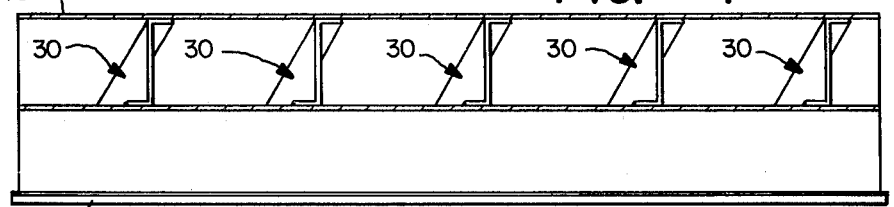
FIG.—2
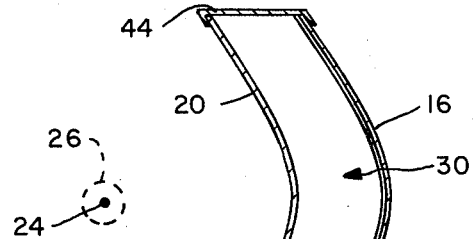
FIG.—3
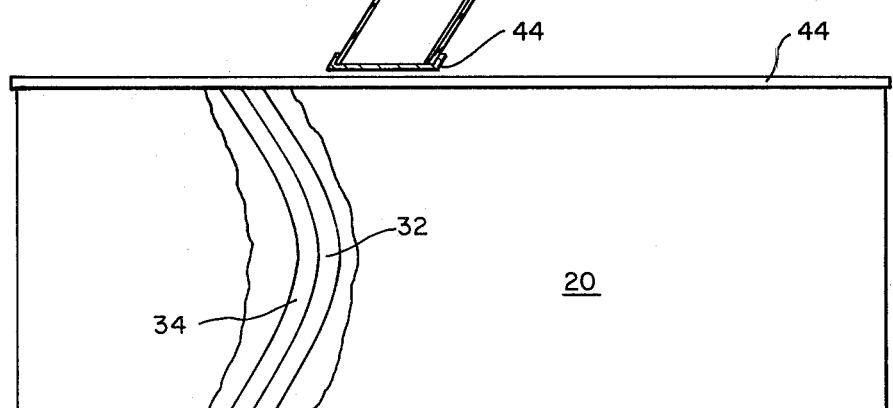
FIG.—4

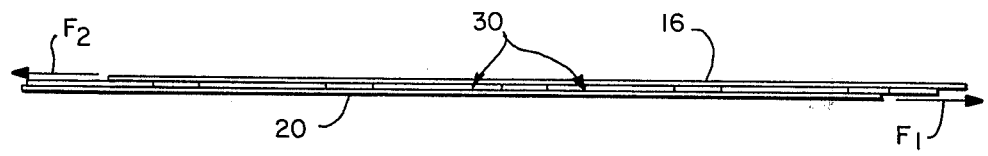
FIG.—5
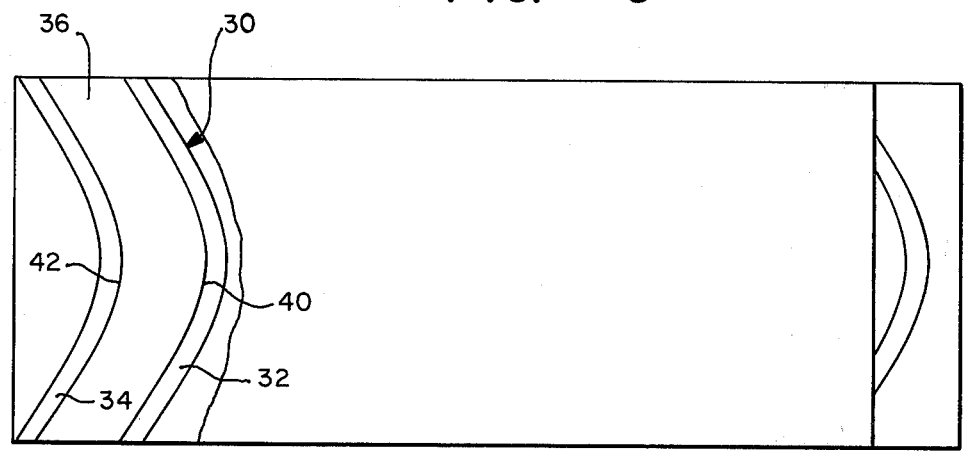
FIG.—6
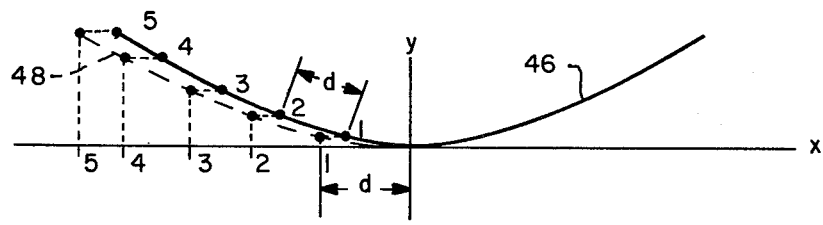
FIG.—7
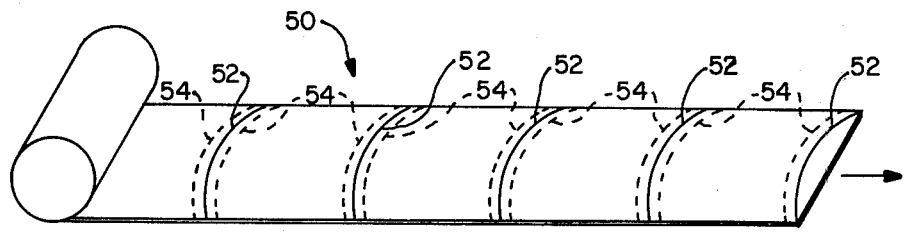
FIG.—8

COLLAPSIBLE STRUCTURAL ASSEMBLY ESPECIALLY SUITABLE AS A SOLAR CONCENTRATOR

The present invention relates generally to collapsible structural assemblies and more particularly to a collapsible trough-like parabolic concentrator or similar light concentrating arrangement for use in an overall solar collector.

A typical large scale solar concentrator is relatively complex structurally requiring a massive array of struts and beams and the like making it time consuming and costly to assemble. It is also usually quite bulky so as to require relatively high shipment costs. As will be seen hereinafter, the present invention overcomes these drawbacks by providing a solar concentrator in the form of a parabolic trough which is uncomplicated from a structural standpoint, which is simple to assemble and which is compact and easy to ship.

In view of the foregoing, one object of the present invention is to provide a solar concentrator having all of the attributes just recited.

Another object of the present invention is to provide a collapsible curved structural assembly generally, for example, one which could be used as part of a curved collapsible shelter or the like, having the same attributes. A more particular object of the present invention is to provide a structural assembly which is designed to be supported between a collapsed, flat configuration for storage and shipping purposes and a specific curved configuration when used as as solar concentrator, one section of a collapsible shelter or the like.

Another more particular object is to provide a particular rib configuration and technique for making the latter for use in an assembly just recited in an uncomplicated and economical way.

As will be seen hereinafter, the structural assembly disclosed herein is one which utilizes first and second sheets of flexible material disposed in confronting relationship to one another. Means are located between and connected with the sheets so as to support the sheets as a single unit for movement between a first collapsed position such that the sheets lie flat and adjacent with the support means therebetween and a second extended position such that the sheets have predetermined curved configurations. In the actual embodiment disclosed herein, the two sheets are supported by an arrangement of foldable ribs which by their own design serve to confer the desired curvature to the sheets when the latter are in the extended position. At the same time, once the sheets are in the extended position, the ribs serve as structural reinforcement therebetween. In the same embodiment, the assembly itself serves as a solar concentrator and, to this end, one of the sheets includes an outermost light reflective surface forming a parabola when the sheets are in the extended position.

The actual embodiment disclosed herein and other aspects of the present invention will be disclosed in more detail hereinafter in conjunction with the drawings wherein:

FIG. 1 is a perspective view of a collapsible structural assembly designed in accordance with the present invention and shown in its extended, non-collapsed position.

FIG. 2 is a longitudinal sectional view taken generally along line 2—2 in FIG. 1;

FIG. 3 is a cross-sectional view taken generally along line 3—3 in FIG. 1;

FIG. 4 is a partially broken away frontal view of the structural assembly of FIG. 1;

FIG. 5 is a longitudinal side view of the structural assembly of FIG. 1 but shown in its collapsed position;

FIG. 6 is a partially broken away frontal view of the collapsed structural assembly of FIG. 5;

FIG. 7 is a diagrammatic illustration of one step in designing the structural arrangement of FIGS. 1–6, and FIG. 8 is a perspective view of continuous sheet material, in roll form, used for a plurality of individual ribs in accordance with the present invention for use in the assembly of FIGS. 1–7.

Turning now to the drawings, wherein like components are designated by like reference numerals throughout the various figures, attention is first directed to FIG. 1 which, as stated above, illustrates a collapsible structural assembly in its extended, non-collapsed state. This assembly which is generally designed by the reference numeral 10 is contemplated for use as a solar concentrator in an overal solar collector and will therefore be described as such. However, it is to be understood that the features of assembly 10 which form the basis of the present invention are equally applicable in assemblies used in other ways as will become apparent.

As illustrated in FIG. 1 in conjunction with FIGS. 2, 3 and 4, structural assembly 10 includes an elongated backing sheet 12 having a front side 14 and an opposite backside 16. A similarly shaped elongated front sheet 18 is disposed in spaced apart, confronting relationship with backing sheet 12 and includes its own frontside 20 and an opposite backside 22. In order to provide collapsibility to assembly 10 in the manner to be described hereinafter, both backing sheet 12 and front sheet 18 must be flexible, at least in the transverse direction. Any material which is otherwise compatible with the intended use of assembly 10 and which accomplishes this end may be used in making the two sheets including plastic and metal material, although in a preferred embodiment rolled sheet metal is preferred. Also, while each sheet may be a single integrally formed sheet, each sheet could be a laminate of a number of flexible similar or different subsheets.

As illustrated best in FIGS. 1 and 3, the two sheets 12 and 18 have curved cross-sections in parallel planes extending through the sheets perpendicular to its lengthwise axis. With assembly 10 serving as a solar concentrator, these curved cross-sections define parabolas so that front sheet 18 serves as a parabolic trough. The focal line of this trough is indicated at 24 in FIG. 3. The front side 20 of front sheet 18 is in the form of a light reflective surface for focusing solar energy impinging thereon to focal line 24. In this regard, the structural assembly 10 as a solar concentrator forms only part of an overall solar collector. The collector also includes a liquid transfer tube or conduit extending along and concentrically around focal line 24 as indicated by dotted lines at 26 in FIG. 3 and means (not shown) for circulating a heat transfer liquid, for example water or oil, through the tube.

In addition to flexible sheets 12 and 18, structural assembly 10 includes an arrangement 28 of elongated, identical ribs 30 located between and connected with the sheets so as to support the sheets as a single unit for movement between the extended parabolic operating position of FIGS. 1–4 and a collapsed position such that the sheets lie flat and adjacent one another with the ribs therebetween, as illustrated in FIGS. 5 and 6. As will be seen below, each of the ribs 30 is itself foldable, somewhat resilient and designed with a predetermined curvature. These ribs which physically interconnect the confronting sheets 12 and 18 serve (1) to determine the specific curvature of the sheets based on their own predesigned curvature and (2) as structural reinforcements when the sheets are maintained in the extended position of FIGS. 1-4.

In the specific embodiment disclosed, each rib 30 is integrally formed as a single unit of at least slightly resilient material, for example, sheet metal or a semi-rigid plastic. One of the ribs is illustrated in FIG. 6 in a collapsed position, that is, against and between the confronting sides of sheets 12 and 18 when the latter are maintained in the collapsed position. As seen in FIG. 6, this rib, like all of the other ribs, includes opposite lengthwise edge sections 32 and 34 and a lengthwise intermediate section 36 joined to the edge sections along hinge lines 40 and 42. The hinge lines may be in the form of scores, e.g., thinner sections of material, or the like, which allow each edge section to flex back and forth, for example 90° between the planar position of FIG. 6 and the perpendicular position of FIG. 2 in the embodiment illustrated. While this angle relationship will be used for purposes of description, it is to be understood that the present invention is not limited thereto.

Edge section 32 of each rib is spot welded or otherwise fixedly attached to front side 14 of backing sheet 12 along its length. Edge section 34 is fixedly attached in the same way to the back side of front sheet 18 along its length. As best seen in FIG. 6, hinge lines 40 and 42 extend the length of and define the outer lengthwise edges of their associated intermediate section 36. With the ribs in the collapsed state as in FIGS. 5 and 6, their respective hinge lines display predesigned curvatures which determine the curvature of sheets 12 and 18 when the latter as a unit are in the non-collapsed operating position of FIGS. 1-4. More specifically, when the sheets 12 and 18 are in the collapsed position shown in FIGS. 5 and 6, by applying sufficient outward force to the ends of the sheets as indicated by arrows F1 and F2, the ribs 30 are caused to move from their collapsed positions parallel with the sheets as in FIG. 5 to the somewhat S-shaped positions perpendicular to the sheets as in FIG. 2. Actually, only the intermediate section 36 of each rib moves from its parallel position to its normal position and does so about hinge lines 40 and 42. The edge sections remain in position against and parallel with their respective attached sheets. As a result of the movement of each intermediate rib section from its planar to its perpendicular position, the attached sheets 12 and 18 are caused to conform with the curvature at the hinge lines which have also been rotated 90° with the intermediate rib section. In actual practice, movement of the intermediate rib sections from their planar to their perpendicular positions cause these sections and their associated hinge lines to flex inward slightly. This means that the collapsed curvature of the hinge lines of FIG. 6 are slightly different than the ultimate curvature of sheets 12 and 18 in FIG. 3. However, as will be seen with respect to FIG. 7 hereinafter, by means of reverse engineering, the initial curvature of hinge lines 40 and 42 necessary to provide a desired operating curvature for sheets 12 and 18 can be determined ahead of time.

Once the two sheets 12 and 18 are moved from the collapsed position to the extended position, a pair of U-shaped channels 44 or other suitable means are disposed around and held tightly along the longitudinal edges of the sheets for preventing the latter from moving back towards the collapsed position. With the channels in position as shown in FIG. 1 the overall assembly is maintained in its extended position and the ribs serve as structural reinforcements. This assembly is structurally sound in spite of its uncomplicated design, the fact that it may be made relatively light in weight and can be easily transported in its collapsed state, and thereafter may be rapidly transformed to its extended operating state. In this regard, it is to be understood that assembly 10 could be designed for uses other than as a solar concentrator, as stated above. For example, as also stated, a single assembly could be one section of a curved collapsible shelter or other such curved structure. Obviously, in this case, it would not be necessary to provide a light reflecting surface and the curvature of the sheets would not necessarily be parabolic. Moreover, whether assembly 10 is used as a solar concentrator, one section of a curved collasible shelter or the like, if it is large in size, as contemplated, a number of smaller channels may be required in lieu of a single continuous channel 44 and means for gripping the sheets 12 and 18 and applying the previously recited forces $F_1$ and $F_2$ thereto might be necessary. For example, with massive assemblies, it may be necessary to pull the sheets out to their extended positions with the aid of power winches or other suitable power driven devices and, in this respect, suitable attaching points would be provided on the sheets.

Having described structural assembly 10, attention is directed to FIG. 7 which describes one way of determining the necessary initial curvature of hinge lines 40 and 42 in order to provide the operating curvature of the hinge lines and sheets 12 and 18. This technique starts with the desired operating curvature of the sheets, for example, the parabolic curvature illustrated in FIG. 3. The solid curved line 46 in FIG. 7 represents this curvature. This curved line is located symmetrically about the vertical (y) axis and the horizontal (x) axis at the origin of the two. Each half section of the curve is divided into segments of equal length "D" at the points 1, 2, 3, and so on starting at the origin of the x, y axis. The x axis is also divided into the same equal segments at points 1, 2, 3 etc. starting at the origin. However, note the points along the x axis do not fall directly under their respective points on the curved line but are slightly offset. In order to find the initial curvature of hinge lines 40 and 42, a vertical line is drawn up from each of the points on the x axis and a horizontal line is drawn out from the associated point on the curve 46, as illustrated in FIG. 7. The points at the intersections of these vertical and horizontal lines provide the plot for the initial curvature which is indicated by dotted lines at 48. While one-half of this curve has been plotted, it should be apparent that the other half could be plotted in the same way. In this regard, it should be apparent that the difference between curve 46 and curve 48 is not substantial. Therefore, if the curvature of sheets 12 and 18 in the extended operating position is not critical and can vary an amount equal to this difference, it is not necessary to provide initial curve 48. Rather, the initial curve of hinge lines 40 and 42 can be provided by the final desired curve 46.

Turning now to FIG. 8, attention is directed to a preferred way of making the individual ribs 30. As stated previously, each rib includes opposite lengthwise edge sections 32 and 34 and a lengthwise intermediate section 36 joined to the edge sections by hinge lines 40 and 42. As seen best in FIG. 6 both the hinge lines and the lengthwise edges of each rib are curved in the manner and for the reasons described. As will be discussed below, each of these ribs can be made from a continuous sheet of material of for example sheet metal or semi-rigid plastic. This sheet material is shown in rolled form in FIG. 8 at 50.

As seen in FIG. 8, the sheet 50 may be divided into individual ribs 30 by a suitable cutting apparatus as indicated by the solid cut lines 52. These cut lines correspond to the lengthwise edges of the ribs. Associated indents may be provided inside each cut line by suitable embossing or like apparatus as indicated by dotted indent lines 54. These indent lines correspond to hinge lines 40 and 42. The cut lines and indent lines may be provided successively or one of these groups may be provided entirely before the other. Once the individual ribs are made and while still flat, the sheets 12 and 18 while flat can be readily welded or otherwise suitably attached to the ribs, as described previously. Thereafter, the entire assembly 10 can then be flexed into its curved operating position and locked in place, as also described. However, it is to be understood that the overall assembly can be placed in its flexed operating position by flexing the ribs into their operating positions before the sheets are attached thereto. In this case, a suitable apparatus will be required to hold the ribs in their flexed positions until the sheets are themselves flexed and welded or otherwise fastened to the flexed ribs. While this latter method of assembling the unit is not as desirable as the first mentioned method, it is nevertheless within the scope of the present invention.

What is claimed is:

1. A collapsible solar concentrator especially suitable as part of an overall solar collector, said solar concentrator comprising: an elongated, flexible backing sheets having a frontside and an opposite backside; an elongated, flexible front sheet having a light reflective frontside and an opposite backside disposed in confronting relationship with the frontside of said backing sheet; means located between and connected with said sheets so as to support the sheets as a single unit so that said unit is capable of movement between a collapsed position such that the sheets lie flat and adjacent to one another with the support means therebetween and a second extended position such that said sheets have parabolic cross sections in predetermined parallel planes extending through the sheets perpendicular thereto, said support means including a plurality of integrally formed and longitudinally spaced elongated ribs located between and extending widthwise across said sheets, each of said ribs having opposite lengthwise edge sections respectively fixedly attached to the confronting sides of said sheets, an intermediate section located between said edge sections and joined to the latter by hinge lines extending the length of said edge and intermediate sections, all of said hinge lines forming part of said ribs displaying a predesigned curved configuration when said sheets are in said collapsed position which determines said parabolic cross-sections of said sheets when the latter are in said extended position, said ribs serving as structural reinforcement between said sheets when the latter are maintained in said extended position; and means for maintaining said sheets in said extended position.

* * * * *